Oct. 8, 1946.    W. HUPPERT    2,408,778
METHOD OF MAKING COMBS FROM SHEET STOCK
Filed Dec. 30, 1943
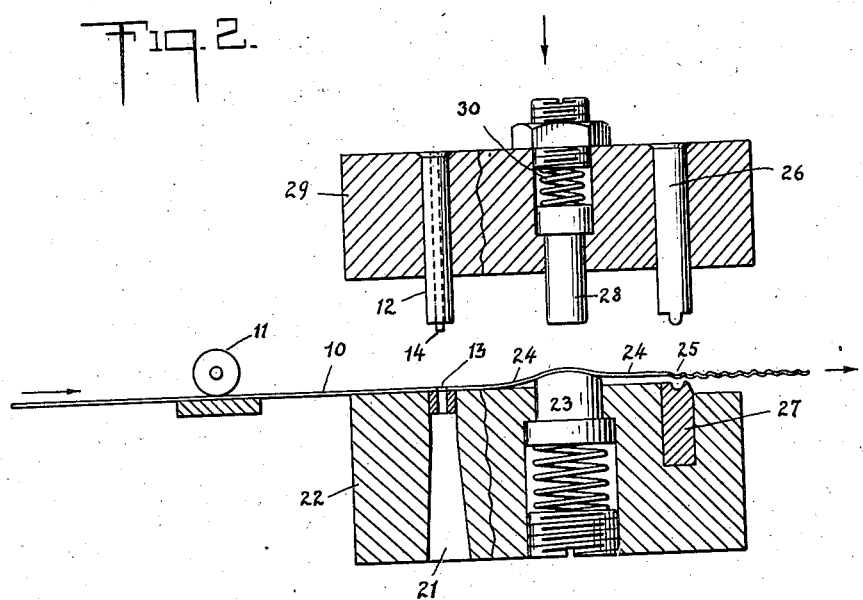
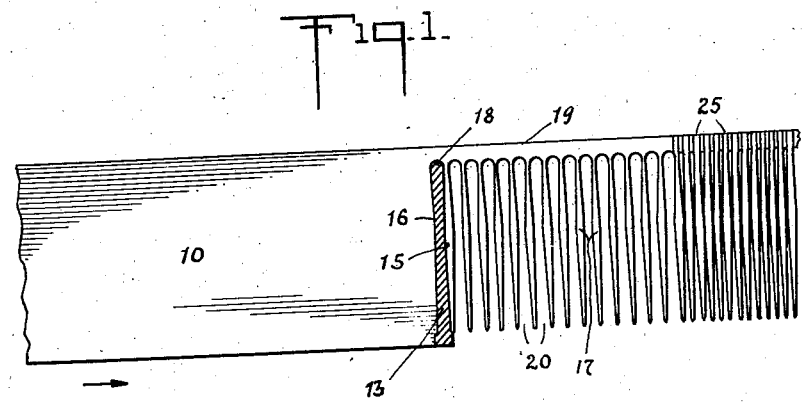
INVENTOR
WILLIAM HUPPERT
BY
ATTORNEY Patented Oct. 8, 1946

2,408,778

UNITED STATES PATENT OFFICE 2,408,778

METHOD OF MAKING COMBS FROM SHEET STOCK

William Huppert, New York, N. Y., assignor to Delamere Company, Inc., a corporation of Delaware Application December 30, 1943, Serial No. 516,171

3 Claims. (Cl. 113—116)

This invention relates to a method of making combs from sheet stock, and more particularly to the manufacture of combs having closely spaced teeth, or having teeth formed with bulging portions that contact or substantially contact corresponding portions of adjacent teeth.

Where the teeth of a comb are very closely spaced, that is, spaced not more than a few thousandths of an inch, or where they are formed with contacting portions, it is impossible to make the comb in the ordinary manner of stamping the teeth.

The principal object of the present invention is to provide an efficient method of manufacturing such combs from sheet stock, as sheet metal and the like.

The manner of practicing the method of this invention is illustrated in the accompanying drawing in which:

Figure 1 is a plan view of a strip of sheet stock showing the steps performed in making the comb; and Fig. 2 is a conventionalized sectional view of one form of apparatus suitable for use in carrying out the invention.

A strip of sheet stock 10 which may be metal or other suitable material is fed along a horizontal support preferably with an intermittent or step-by-step motion. Any suitable means for feeding the stock, such as a grip feed 11, may be employed.

The strip travels under a blanking die 12 that operates at intervals synchronized with the feed to remove or blank out successive portions of the stock to shape or form the teeth 17.

One form of apparatus for carrying out the method is illustrated diagrammatically in the drawing. It is to be understood that the invention is not limited to the particular apparatus shown. With use of the apparatus shown, at each operation the die blanks out a portion 13 of the stock, which portion is indicated in Fig. 1 by the hatching. The face 14 of the die may be formed to cut or stamp opposed edges 15 and 16 of the adjacent comb-teeth 17 and the edge 18 of the connecting portion 19 between the teeth, so that each tooth will be completely outlined by two successive operations of the blanking die.

On reference to Fig. 2 it will be seen that as initially formed, the teeth 17 are relatively wide-spaced, the spaces 20 between the teeth correspond to the shape and size of the blanked out portions 13 of the stock. The blanked out portions 13 are discharged through the opening 21 in the stationary support or bed 22.

After several of the teeth have been formed the strip passes over a spring actuated member 23 that serves to raise the stock temporarily out of its normal path of travel so as to provide a slack in the stock, as indicated by 24 in Fig. 2.

The connecting portion 19 between each pair of teeth 17 is then crimped or otherwise suitably deformed, as indicated at 25, to draw the teeth together so as to reduce the space between them to a few thousanths of an inch, or in the case where the tooth-form has a bulging portion, as shown in Fig. 1, to draw the bulging portions of the teeth into contact or substantially into contact with each other. The slack 24 formed in the stock by raising it from the support provides sufficient material so that the connecting portions 19 may be successively crimped.

The crimping operations may be conveniently performed by means of a crimping die comprising a male member 26 and a female member 27, as indicated in Fig. 2. The male member 26, as well as the blanking die 12, and the member 28, hereinafter described, may be mounted in a suitable plate or support 29 which moves up and down relative to the fixed bed or support 22, and in properly timed relation to the feed of the stock. Any suitable means, not shown, may be employed to so move the parts.

The member 28, which is provided with an adjustable spring 30, serves to push the spring actuated member 23 down into retracted position at each operation of the blanking and the crimping dies.

While I have described, and diagrammatically illustrated, certain mechanisms suitable for the practice of the method, it is to be understood that it may be carried out with the use of other mechanisms or by other means.

In practice, the sheet stock after having been blanked and crimped is cut into strips of the desired lengths to form a comb, and it may then be curved or shaped in any desired manner.

What I claim is:

1. The method of making a comb from sheet stock, which comprises feeding the stock with a step by step movement, removing a portion of the stock at each period of rest of the feed to define the opposed edges of two adjacent teeth and the edge of a connecting portion, temporarily raising the stock out of its normal plane of travel to provide slack, and forming a crimp in the slackened stock between each pair of teeth successively to draw the teeth closer together.

2. The method of making a comb from sheet stock which comprises the steps of feeding the stock with an intermittent motion, and at each interval of rest of the feed first blanking the stock to form a tooth spaced from and connected at its upper end with a previously formed tooth, then temporarily moving the stock out of its normal plane of feed to provide sufficient slack in the connecting portion between said tooth pair to permit deformation thereof without undue strain, and then deforming the slackened connecting portion between said pair of teeth to decrease the spacing of the teeth.

3. The method of making a comb from sheet stock which comprises blanking the stock to form successive teeth spaced apart and connected together at their upper ends, deforming the connecting portion between each pair of teeth individually to decrease uniformly the spacing of all of the teeth in successive deforming operations, and providing sufficient slack in the connecting portion immediately prior to each deforming operation to permit of such deformation without undue strain.

WILLIAM HUPPERT.